United States Patent
Park et al.

(10) Patent No.: US 9,662,984 B2
(45) Date of Patent: May 30, 2017

(54) METHOD AND SYSTEM FOR CONTROLLING ENVIRONMENTALLY-FRIENDLY VEHICLE

(71) Applicant: Hyundai Motor Company, Seoul (KR)

(72) Inventors: Jun Yeon Park, Yongin-si (KR); Youngjo Lee, Seoul (KR); Deukhoon Koh, Seoul (KR); Taehyuck Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 623 days.

(21) Appl. No.: 14/107,778

(22) Filed: Dec. 16, 2013

(65) Prior Publication Data

US 2015/0084410 A1   Mar. 26, 2015

(30) Foreign Application Priority Data

Sep. 26, 2013   (KR) .......................... 10-2013-0114699

(51) Int. Cl.
| | | |
|---|---|---|
| *B60L 1/00* | (2006.01) | |
| *B60L 3/00* | (2006.01) | |
| *H02G 3/00* | (2006.01) | |
| *B60L 11/18* | (2006.01) | |

(Continued)

(52) U.S. Cl.
CPC ........ *B60L 1/00* (2013.01); *B60L 3/00* (2013.01); *B60L 11/1868* (2013.01); *B60L 15/2045* (2013.01); *B60L 2210/10* (2013.01); *H02H 7/18* (2013.01); *Y02T 10/645* (2013.01); *Y02T 10/7005* (2013.01); *Y02T 10/7066* (2013.01);

(Continued)

(58) Field of Classification Search
CPC ... B60L 1/00; B60L 3/00; B60L 11/18; H02H 7/18; H01M 10/48; G01R 31/36; G01F 19/00; H02J 7/0054; B60R 16/02
USPC ...... 307/10.1, 9.1, 10.6, 10.7, 116; 320/109, 320/103; 701/22; 702/63; 180/65.21, 180/65.265; 903/903
See application file for complete search history.

(56) References Cited

U.S. PATENT DOCUMENTS 3,356,922 A * 12/1967 Johnston ............... H02J 7/027
307/66
8,531,053 B2 * 9/2013 Choi ..................... B60K 6/48
180/65.265

(Continued)

FOREIGN PATENT DOCUMENTS

JP   2011031870 A   2/2011
JP   2011-151937 A   8/2011

(Continued)

*Primary Examiner* — Rexford Barnie
*Assistant Examiner* — Jagdeep Dhillon
(74) *Attorney, Agent, or Firm* — McDermott Will & Emery LLP

(57) ABSTRACT

A method of controlling a low voltage DC-DC converter (LDC) of an environmentally-friendly vehicle includes measuring load current consumed by electric loads of the vehicle; identifying a state of an auxiliary battery vehicle; and when the load current is smaller than a predetermined value, and the state of the auxiliary battery is equal to or greater than a predetermined value, performing a first eco mode of stopping operation of the LDC for a predetermined time, and causing the auxiliary battery to supply the current necessary for the electric loads.

6 Claims, 7 Drawing Sheets

(51) Int. Cl.
 *B60L 15/20* (2006.01)
 *H02H 7/18* (2006.01)
(52) U.S. Cl.
 CPC ........ *Y02T 10/7216* (2013.01); *Y02T 10/7283* (2013.01)

(56) References Cited

U.S. PATENT DOCUMENTS

| | | | | |
|---|---|---|---|---|
| 2001/0019224 | A1* | 9/2001 | Amano | B60L 11/14 307/10.7 |
| 2008/0077339 | A1* | 3/2008 | Seo | B60L 11/1861 702/63 |
| 2012/0074900 | A1* | 3/2012 | Takikita | B60L 11/1811 320/109 |
| 2012/0143417 | A1* | 6/2012 | Chung | B60W 20/00 701/22 |
| 2013/0169212 | A1* | 7/2013 | Sun | H02M 3/33592 320/103 |
| 2013/0249283 | A1* | 9/2013 | Yokoyama | H01M 10/44 307/10.1 |
| 2015/0061376 | A1* | 3/2015 | Hartl | B60R 16/02 307/9.1 |

FOREIGN PATENT DOCUMENTS

| | | | |
|---|---|---|---|
| JP | 2011-223833 A | 11/2011 | |
| JP | WO 2012081330 A1 * | 6/2012 | ............ H01M 10/44 |
| KR | 1998015204 | 5/1998 | |
| KR | 10-0867795 B1 | 11/2008 | |

* cited by examiner

METHOD AND SYSTEM FOR CONTROLLING ENVIRONMENTALLY-FRIENDLY VEHICLE

CROSS-REFERENCE TO RELATED APPLICATION

This application claims priority to and the benefit of Korean Patent Application No. 10-2013-0114699 filed in the Korean Intellectual Property Office on Sep. 26, 2013, the entire contents of which are incorporated herein by reference.

BACKGROUND (a) Technical Field

The present disclosure relates to a method of controlling an environmentally-friendly vehicle, which controls a low voltage DC-DC converter (LDC) based on the state of an auxiliary battery of the vehicle and electric loads of the vehicle in order to maximize efficiency of the LDC of the environmentally-friendly vehicle.

(b) Description of the Related Art

As is well known, according to demands for improving the fuel efficiency of a vehicle and stronger on board diagnosis (OBD) regulations for exhaust gas, an environmentally-friendly vehicle has been provided.

An environmentally-friendly vehicle generally includes a fuel cell vehicle, an electric vehicle, a plug-in electric vehicle, and a hybrid vehicle, and includes one or more motors and engines.

The environmentally-friendly vehicle includes, for example, as illustrated in FIG. 1, a high voltage battery 20 for storing high voltage power for driving a motor 70, a bi-directional high voltage DC-DC converter (BHDC) 30 for converting a voltage input/output to/from the high voltage battery 20, an inverter 60, which is an electronic power control device, for converting a DC high voltage of the high voltage battery 20 to an AC voltage to drive the motor 70, a low voltage DC-DC converter (LDC) 50 for converting a DC high voltage to a DC low voltage to charge an auxiliary battery 40, a junction box 80, and various loads 90 for driving the environmentally-friendly vehicle.

The junction box 80 is disposed between the BHDC 30, the inverter 60, the LDC 50, and the various vehicle loads 90 to perform a connection therebetween.

The auxiliary battery 40 may be a battery of 12 V, and supplies power to components of the vehicle, for example, various electric loads of the vehicle, using a predetermined driving voltage.

Since the electric loads using the auxiliary battery 10 as a power source continuously consume power during the driving of the vehicle, the LDC 50 controls a power supply of the auxiliary battery 10 in order to charge the auxiliary battery 10.

The LDC 50 has an advantage in that conversion control is simple, and the LDC 50 is implemented with a small number of elements in general, whereby the LDC 50 is formed of a zero voltage switching (ZVS) full-bride pulse width modulation (PWM) circuit.

However, when a load is low or there is no load, ZVS fails, so that the entire efficiency of the LDC having the aforementioned configuration may deteriorate due to switching loss.

In order to solve the aforementioned problem in the related art, maximization of efficiency of the LDC is promoted by determining whether to operate the LDC and limiting an output current by comparing an output voltage of the LDC and a voltage of an auxiliary battery. However, the related art does not consider the state of the auxiliary battery, so that the life of the auxiliary battery may be decreased, and further, the auxiliary battery may be discharged in a case in which the load of a vehicle is sharply changed.

The above information disclosed in this Background section is only for enhancement of understanding of the background of the invention and therefore it may contain information that does not form the prior art that is already known in this country to a person of ordinary skill in the art.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method and a system for controlling an environmentally-friendly vehicle, which maximizes efficiency of an LDC by determining whether to operate the LDC and controlling an output current according to the state of an auxiliary battery and electric loads of the vehicle while operating the LDC of the environmentally-friendly vehicle.

An exemplary embodiment of the present invention provides a method of controlling a low voltage DC-DC converter (LDC) of an environmentally-friendly vehicle, including measuring load current consumed by electric loads of the environmentally-friendly vehicle; identifying a state of charge (SOC) and a state of health (SOH) of an auxiliary battery of the environmentally-friendly vehicle; and when the load current is smaller than a predetermined value, and the SOC and the SOH are equal to or greater than a predetermined value, performing a first eco mode of stopping the operation of the LDC for a predetermined time, and causing the auxiliary battery to supply current necessary for the electric loads.

The predetermined time for which the operation of the LDC is stopped in the first eco mode may be set based on a discharge map of the auxiliary battery, and when the predetermined time elapses, the first eco mode may be released.

The method may further include: when the load current is equal to or greater than a predetermined value, the SOC and the SOH are equal to or greater than a predetermined value, and rate of an increase in a discharge current of the auxiliary battery is smaller than rate of an increase in the load current, performing a second eco mode of controlling an output current of the LDC to a predetermined level for the predetermined time; and when the electric load is increased so that the rate of the increase in the load current is equal to or greater than the rate of the increase in the discharge current of the auxiliary battery, releasing the second eco mode.

When a current equal to or larger than the controlled output current of the LDC is required, the auxiliary battery may supplement the current.

The predetermined value of the load current may be 4 to 6 A, and the predetermined values of the SOC and the SOH may be 80 to 90%.

Power consumed by the electric loads corresponding to the predetermined value of the load current may be 100 W.

Another exemplary embodiment of the present invention provides a system for controlling an environmentally-friendly vehicle, including a low voltage DC-DC converter (LDC) configured to convert a DC high voltage to a DC low voltage; an auxiliary battery charged with the DC low voltage converted by the LDC, and configured to supply low voltage power to electric loads of the environmentally-friendly vehicle; and a controller configured to control the LDC based on a state of the auxiliary battery and a load of the vehicle, in which the controller is operated by a stored program configured for controlling the environmentally-friendly vehicle according to the exemplary embodiment of the present invention.

As described above, according to the exemplary embodiments of the present invention, it is possible to improve fuel efficiency of a vehicle by maximizing efficiency of the operation of the LDC according to electric loads of the vehicle.

According to the exemplary embodiments of the present invention, it is possible to stop operation of the LDC according to a state of the auxiliary battery when load is low or very low, thereby decreasing energy loss.

According to the exemplary embodiments of the present invention, it is possible to flexibly control output current of the LDC according to a state of the auxiliary battery when load is high or normal, thereby improving performance of the LDC.

According to the exemplary embodiments of the present invention, it is possible to improve durability of the auxiliary battery.

DETAILED DESCRIPTION OF THE EMBODIMENTS

Figure 1:
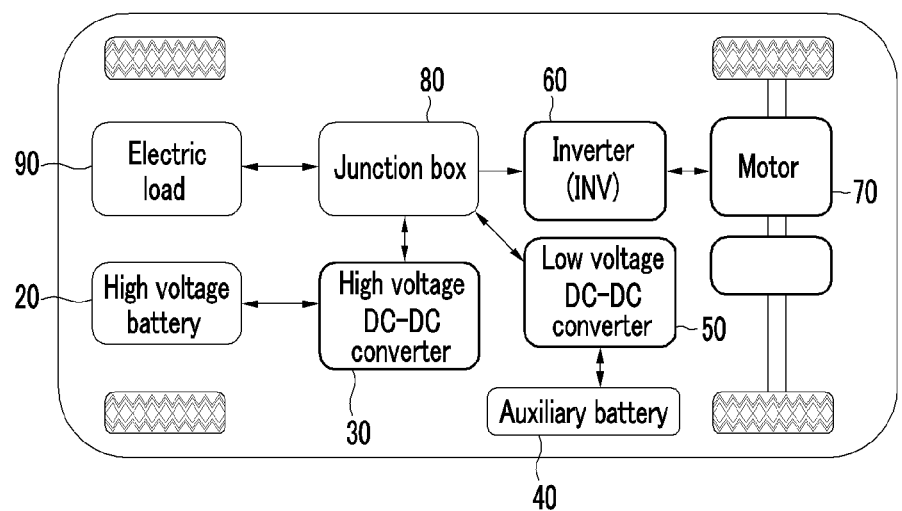
FIG. 1 is a block diagram illustrating a control system of a general environmentally-friendly vehicle.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In addition, unless explicitly described to the contrary, the word "comprise" and variations such as "comprises" or "comprising", will be understood to imply the inclusion of stated elements but not the exclusion of any other elements. Like reference numerals designate like elements throughout the specification.

Figure 2:
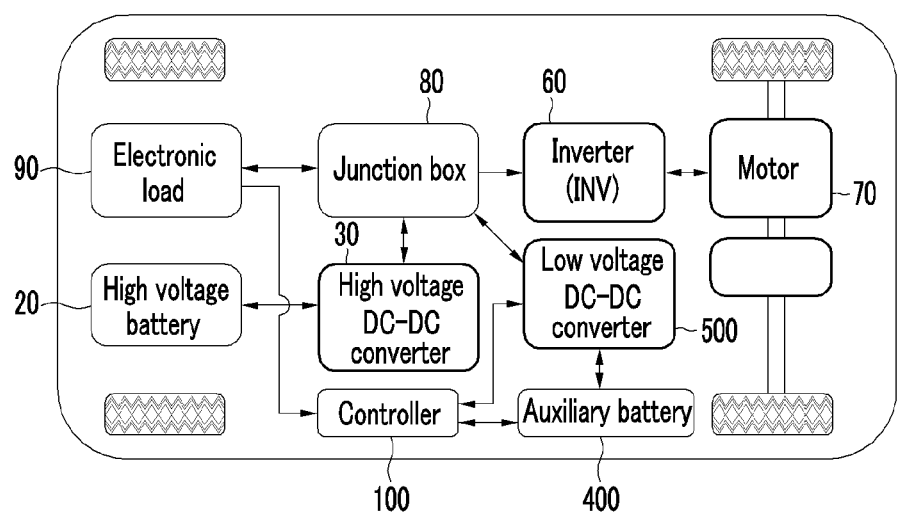
FIG. 2 is a block diagram illustrating a control system of an environmentally-friendly vehicle according to an exemplary embodiment of the present invention.

FIG. 2 is a block diagram schematically illustrating a control system of an environmentally-friendly vehicle according to an exemplary embodiment of the present invention.

The control system of the environmentally-friendly vehicle according to the exemplary embodiment of the present invention is a system for controlling a lower voltage DC-DC converter (LDC) based on a state of an auxiliary battery and electric loads of the vehicle.

The control system of the environmentally-friendly vehicle according to the exemplary embodiment of the present invention includes a high-voltage battery 20 for storing high voltage power for driving a motor 70, a bi-directional high voltage DC-DC converter (BHDC) 30 for converting a voltage input/output to/from the high voltage battery 20, an inverter 60 for converting a DC high voltage of the high voltage battery 20 to an AC voltage to drive the motor 70, a low voltage DC-DC converter (LDC) 500 for converting a DC high voltage to a DC low voltage to charge an auxiliary battery 400, a junction box 80, and various electric loads 90 for driving the environmentally-friendly vehicle.

The constituent elements denoted by the same reference numerals in FIGS. 1 and 2 are substantially the same as each other, and are previously described or are apparent to those skilled in the art, so that detailed descriptions thereof will be omitted.

A controller 100 comprises one or more microprocessors operated by a stored program, and/or a hardware including the microprocessor, and the stored program may include a series of commands for performing a control method of an environmentally-friendly vehicle according to the exemplary embodiment of the present invention to be described below.

The controller 100 may include the LDC 500, or the LDC 500 may include the controller 100. That is to say, the controller 100 may be included in the LDC 500 as a control portion executing the stored program.

Figure 3:
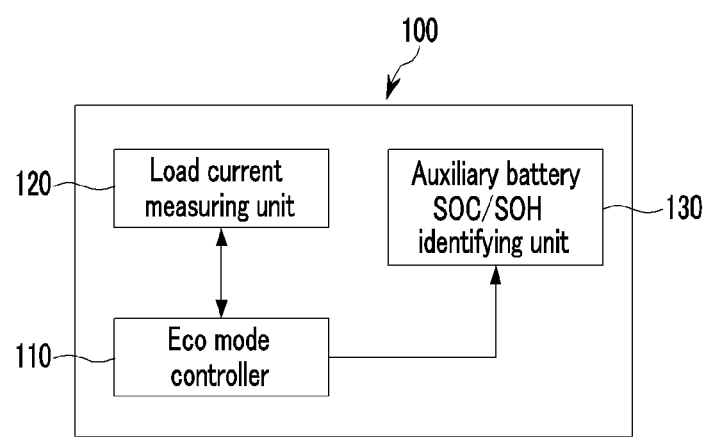
FIG. 3 is a block diagram illustrating a controller of the control system of the environmentally-friendly vehicle according to the exemplary embodiment of the present invention in detail.

The controller 100 may include a load current measuring unit 120, an auxiliary battery SOC/SOH identifying unit 130, and an eco mode controller 110 as illustrated in FIG. 3.

The load current measuring unit 120 may be formed of a program and/or elements for measuring a load current consumed by the electric loads 90 of the environmentally-friendly vehicle.

The auxiliary battery SOC/SOH identifying unit 130 may be formed of a program and/or elements capable of identifying an SOC and an SOH of the auxiliary battery 400.

When the load current is smaller than a predetermined value (for example, 4 to 6 A), and the SOC and the SOH of the auxiliary battery 400 are equal to or greater than a predetermined value (80 to 90%), the eco mode controller 110 may perform a first eco mode of stopping an operation of the LDC 500 for a predetermined time (for example, five minutes), and causing the auxiliary battery 400 to supply the current necessary for the electric loads 90.

Further, when the load current is equal to or greater than the predetermined value (for example, 4 to 6 A), the SOC and the SOH of the auxiliary battery 400 are equal to or greater than the predetermined value (for example, 80 to 90%), and rate of increase in a discharge current of the auxiliary battery 400 is smaller than rate of increase in the load current, the eco mode controller 110 may perform a second eco mode of controlling an output current of the LDC 500 to a predetermined level for a predetermined time (for example, five minutes). Further, when the electric loads 90 are increased, so that the rate of the increase in the load current is equal to or greater than the rate of the increase in the discharge current of the auxiliary battery 400, the eco mode controller 110 may perform an operation of releasing the second eco mode.

Figure 5:
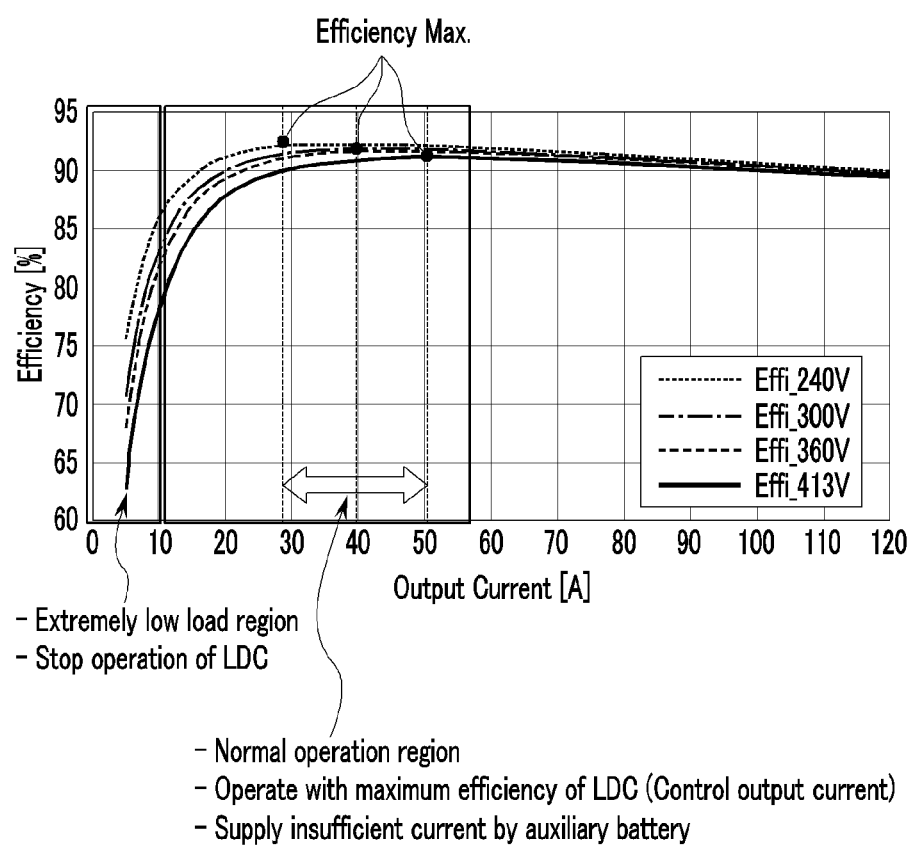
FIG. 5 is a graph illustrating an operation region according to the exemplary embodiment of the present invention.

The controller 100 may divide an operation region into two operation regions (an extremely low load region, and a high load or a normal load region) according to efficiency of the operation of the LDC 500 as illustrated in FIG. 5 to perform a control operation. Referring to FIG. 5, it can be seen that when the electric load of the vehicle is an extremely low load, efficiency of the operation of the LDC 500 is very low.

Accordingly, when the electric load of the vehicle is in the extremely low load state or the low load state, for example, when power consumed by the electric load of the vehicle is less than 100 W, and the SOC and the SOH of the auxiliary battery 400 are in a sufficient state, for example, the SOC and the SOH of the auxiliary battery 400 are equal to or greater than 80%, the controller 100 may stop the operation of the LDC 500 for a predetermined time to avoid operation in a section in which efficiency is poor.

Further, when the electric load of the vehicle is a high load or a normal load, the controller 100 may control the output current of the LDC 500 so that the LDC 500 is operated at a point exhibiting maximum efficiency, and may control the auxiliary battery 400 to supply an insufficient current as illustrated in FIG. 5.

Figure 6:
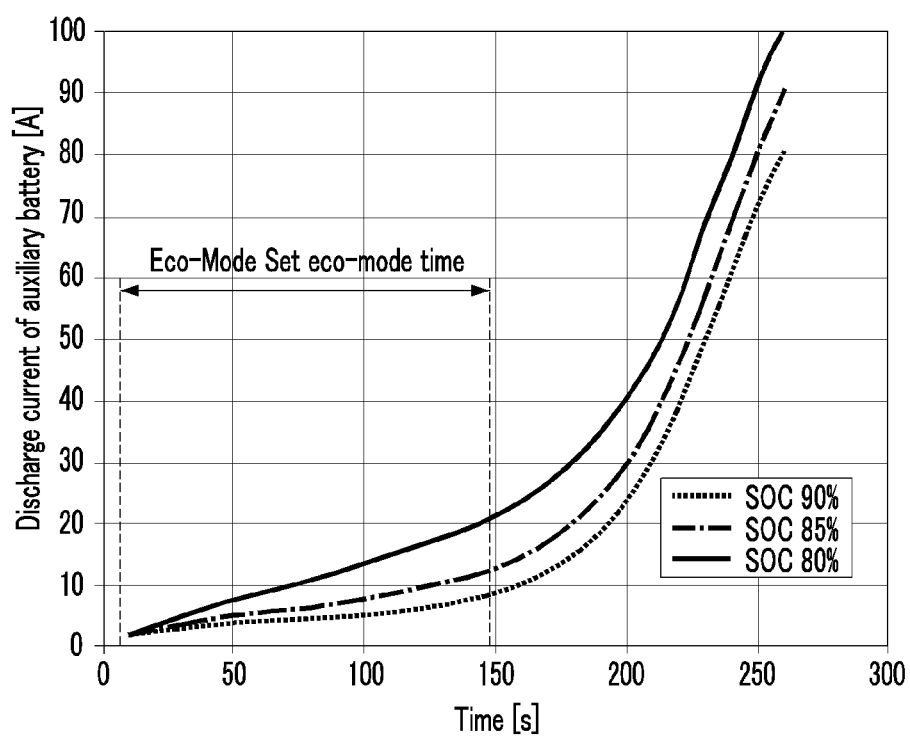
FIG. 6 is an example of a map graph of discharge current of an auxiliary battery for setting an eco mode operation time according to the exemplary embodiment of the present invention.

The controller 100 may set an operation time of the eco mode by using a map of the discharge current of the auxiliary battery 400 as illustrated in FIG. 6.

Figure 7:
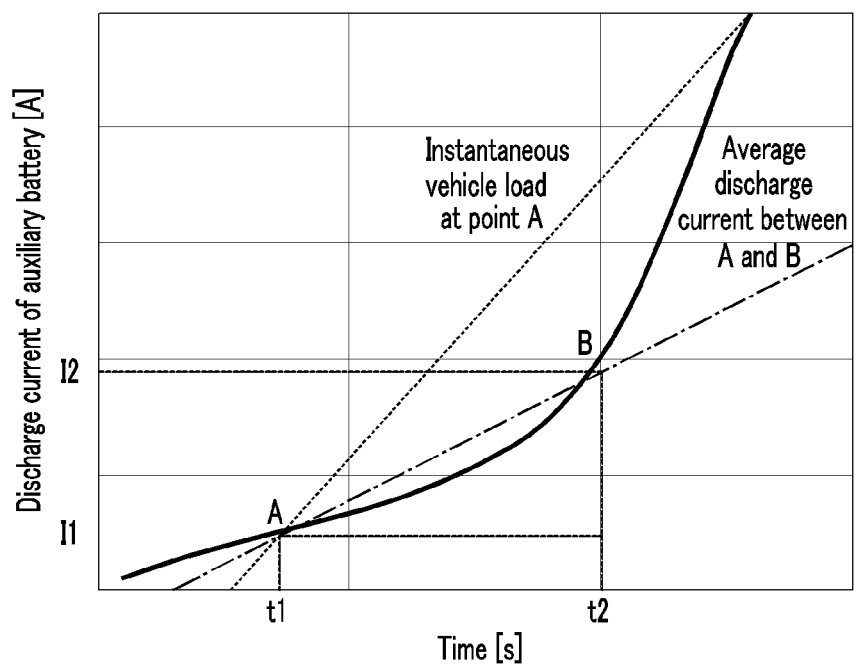
FIG. 7 is a graph illustrating change in current draw of a load and a discharge current of the auxiliary battery according to the exemplary embodiment of the present invention.

As illustrated in FIG. 6, the discharge current of the auxiliary battery 400 is changed according to the electric loads of the vehicle and the SOC and the SOH of the auxiliary battery, and the discharge rate of the current may be changed according to capacity of the electric loads of the vehicle as illustrated in FIG. 7.

When the electric load of the vehicle is sharply changed from an extremely low load to a high load, the controller 100 may release the eco mode by comparing rate of change of a load of the vehicle and rate of change of an average discharge current of the auxiliary battery as illustrated in FIG. 7.

Hereinafter, a control method of the environmentally-friendly vehicle according to the exemplary embodiment of the present invention will be described in detail with reference to the accompanying drawings.

Figure 4:
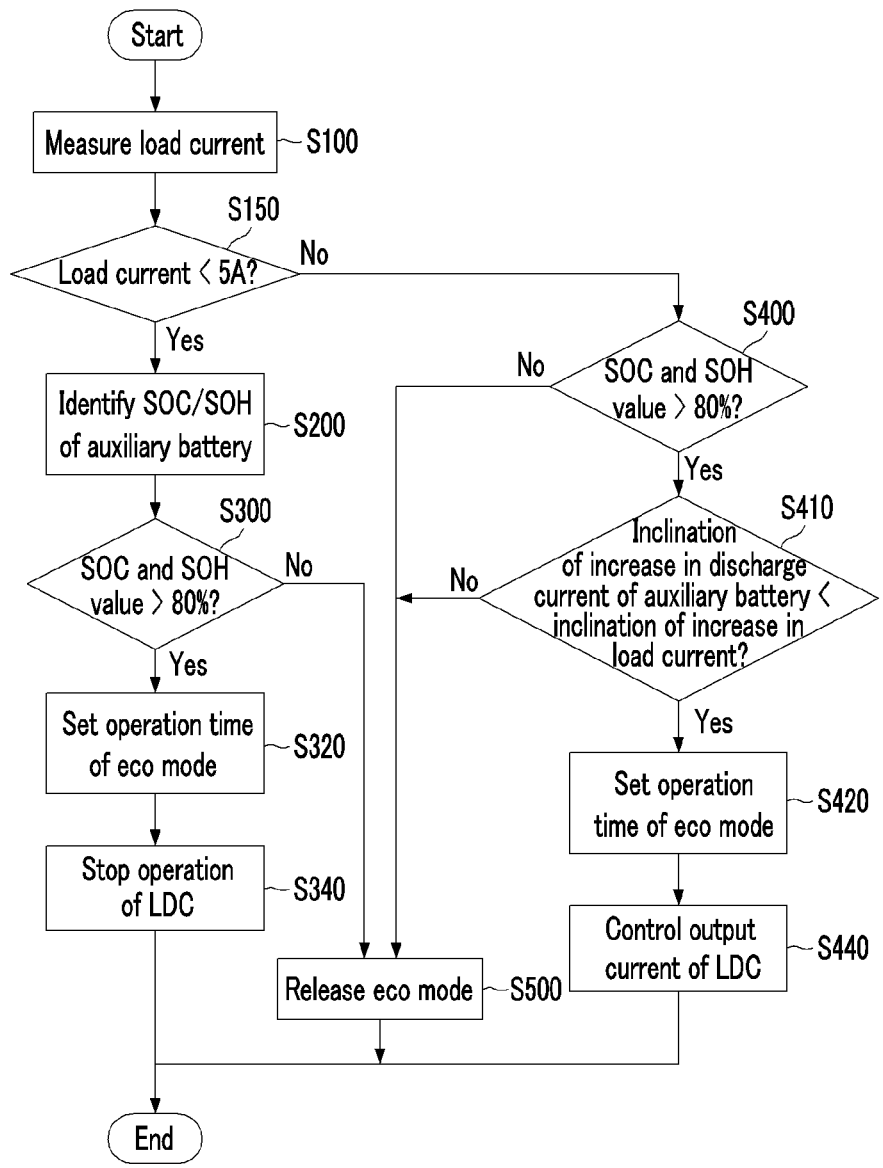
FIG. 4 is a flowchart illustrating a control method of the environmentally-friendly vehicle according to the exemplary embodiment of the present invention.

FIG. 4 is a flowchart illustrating the control method of the environmentally-friendly vehicle according to the exemplary embodiment of the present invention.

As illustrated in FIG. 4, when the LDC 500 is operated, the load current measuring unit 120 of the controller 100 measures load current consumed by the electric loads 90 (S100). A configuration for measuring the current consumed by the electric loads 90 is apparent to those skilled in the art, so that a description thereof will be omitted.

When the load current is measured, the controller 100 determines whether the measured load current is smaller than a predetermined value (for example, 5 A) (S150).

When the measured load current is smaller than the predetermined value, the controller 100 identifies an SOC and an SOH of the auxiliary battery 400 (S200). A method of identifying the SOC and the SOH of the auxiliary battery 400 is widely and publicly known to those skilled in the art, so that a description thereof will be omitted.

When the SOC and SOH of the auxiliary battery 400 are identified, the controller 100 determines whether the identified SOC and the SOH are equal to or greater than a predetermined value (for example, 80%) (S300).

When the identified SOC and SOH are equal to or greater than the predetermined value (for example, 80%), the controller 100 sets a time based on the map of the discharge current of the auxiliary battery 400 illustrated in FIG. 6, stops the operation of the LDC 500 for the predetermined time, and causes the auxiliary battery 400 to supply a current necessary for the electric loads 90 (S320 and S340).

When the SOC and SOH identified in step S300 are smaller than the predetermined value, the controller 100 controls the LDC 500 by an existing general method, not in the eco mode (S500).

In the meantime, when the load current is equal to or greater than the predetermined value in step S150, the controller 100 determines whether the SOC and the SOH of the auxiliary battery 400 are equal to or greater than the predetermined value (for example, 80%) (S300).

When the SOC and the SOH of the auxiliary battery 400 are equal to or greater than the predetermined value in step S400, the controller 100 determines whether rate of increase in the discharge current of the auxiliary battery 400 illustrated in FIG. 7 is smaller than rate of increase of the load current (S410).

When the rate of increase in the discharge current is smaller than the rate of increase of the load current, the controller 100 limits an output current of the LDC 500 for a predetermined time, and causes the auxiliary battery 400 to supply insufficient current (S420 and S440).

For example, when the input voltage of the LDC 500 is 240 V, current consumed by the electric loads 90 is 45 A, and maximum efficiency of the LDC 500 at the input voltage is achieved at an output current of 30 A, the controller 100 limits the output current of the LDC 500 to 30 A, and causes the auxiliary battery 400 to supplement the insufficient current of 15 A.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling a low voltage DC-DC converter (LDC) of an environmentally-friendly vehicle, comprising:
   measuring a load current consumed by electric loads of the environmentally-friendly vehicle;
   identifying a state of an auxiliary battery of the environmentally-friendly vehicle; and
   when the load current is smaller than a predetermined value, and the state of the auxiliary battery is equal to or greater than a predetermined value, performing a first eco mode of stopping the operation of the LDC for a predetermined time, and causing the auxiliary battery to supply a current necessary for the electric loads,
   wherein the predetermined time for which the operation of the LDC is stopped in the first eco mode is set based on a discharge map of the auxiliary battery, and
   when the predetermined time elapses, the first eco mode is released.

2. The method of claim 1, further comprising:
   when the load current is equal to or greater than a predetermined value, the state of the auxiliary battery is equal to or greater than a predetermined value, and a rate of an increase in a discharge current of the auxiliary battery is smaller than a rate of an increase in the load current, performing a second eco mode of controlling an output current of the LDC to a predetermined level for the predetermined time; and when the electric load is increased so that the rate of the increase in the load current is equal to or greater than the rate of the increase in the discharge current of the auxiliary battery, releasing the second eco mode.

3. The method of claim 2, wherein:

when a current equal to or larger than the controlled output current of the LDC is required, the auxiliary battery is controlled to supplement the current.

4. The method of claim 1, wherein:

the predetermined value of the load current is 4 to 6 A, and the predetermined values of the state of the auxiliary battery is 80 to 90%.

5. The method of claim 1, wherein:

power consumed by the electric loads corresponding to the predetermined value of the load current is 100 W.

6. A system for controlling an environmentally-friendly vehicle, comprising:

a low voltage DC-DC converter (LDC) configured to convert a DC high voltage to a DC low voltage;

an auxiliary battery charged with the DC low voltage converted by the LDC, and configured to supply low voltage power to electric loads of the environmentally-friendly vehicle; and a controller configured to control the LDC based on a state of the auxiliary battery and a load of the vehicle, wherein the controller is operated by a stored program configured for performing the method of any one of claims 1 and 2-5.

* * * * *